United States Patent [19]

McOnie et al.

[11] 4,181,787

[45] Jan. 1, 1980

[54] VINYL HALIDE POLYMERIZATION PROCESS AND REACTOR THEREFOR

[75] Inventors: Malcolm P. McOnie, St. Albans; Philip D. Roberts, Harpenden; John B. Rose, Letchworth, all of England; Boris Englin, Chadstone, Australia

[73] Assignee: ICI Australia Limited, Melbourne, Australia

[21] Appl. No.: 862,298

[22] Filed: Dec. 19, 1977

[30] Foreign Application Priority Data

Dec. 23, 1976 [AU] Australia ............... 8604/76
May 4, 1977 [AU] Australia ............... 9981/77

[51] Int. Cl.$^2$ .............................................. C08F 2/10
[52] U.S. Cl. ................................................ 526/62
[58] Field of Search ........................................ 526/62

[56] References Cited

U.S. PATENT DOCUMENTS

| | | | |
|---|---|---|---|
| 3,669,946 | 6/1972 | Koyanagi et al. | 516/62 |
| 3,778,423 | 12/1973 | Reiter | 526/62 |
| 3,915,944 | 10/1975 | Burgess et al. | 526/62 |
| 4,024,301 | 5/1977 | Witeuhafer et al. | 526/62 |
| 4,024,330 | 5/1977 | Morningstar et al | 526/62 |
| 4,076,951 | 2/1978 | Katayama et al. | 526/62 |
| 4,080,173 | 3/1978 | Cohen | 526/62 |

*Primary Examiner*—Paul R. Michl
*Attorney, Agent, or Firm*—Cushman, Darby & Cushman

[57] ABSTRACT

Build-up during vinyl halide, particularly vinyl chloride, polymerization is prevented by employing a reactor having an adherent internal coating of a product derived from the admixture of at least polyethyleneimine and one or more of hydroquinone, p-benzoquinone, catechol and o-benzoquinone. The preferred system excludes catechol, p-benzoquinone and o-benzoquinone and optionally includes a small quantity of pyrogallol. The chemical constitution of the resulting coating product is not properly understood but is thought to include aminoquinonoid structures, condensates and radical anions. One embodiment is directed towards low temperature formation of the coating product in the presence of oxygen and on the reactor surface. Another embodiment concerns preforming the coating product and then applying it to the reactor surfaces.

22 Claims, No Drawings

VINYL HALIDE POLYMERIZATION PROCESS AND REACTOR THEREFOR

The present invention relates to a process for the polymerisation of vinyl halide monomers such as vinyl chloride in aqueous dispersion, to a reactor wherein such a polymerisation process may be carried out and to a certain product when used to coat the internal surfaces of such a reactor.

When vinyl halide monomers, particularly vinyl chloride, are polymerised in aqueous dispersion in a reactor it is well known that a problem arises in that surfaces inside the reactor become coated with tenaciously adhering polymeric material known as build-up. By polymerisation in aqueous dispersion is meant polymerisation in aqueous emulsion or aqueous suspension (including aqueous microsuspension). The formation of tenaciously adhering build-up is undesirable from the point of view of achieving efficient heat transfer for cooling and heating the reactor contents, effective usage of monomer, effective control and monitoring of the polymerisation reaction, and acceptable polymer quality (in view of contamination by dislodged particles of the build-up).

Because of the problems in respect of heat transfer, polymerisation control and polymer quality, it is necessary to clean the reactor between each polymerisation cycle wherein the deposited material is removed as completely as possible, e.g. by scraping or chipping by hand, solvent cleaning or pressure-washing. This is wasteful in terms of the expense of the equipment and manpower required to carry out such cleaning and also in terms of the loss of productivity for a given reactor arising from the time taken to effect the cleaning operation. Hand cleaning is additionally undesirable in that it may constitute a health hazard to the cleaner in view of the harmful properties of certain monomers, particularly vinyl chloride. Indeed, opening up the reactor between polymerisation cycles for cleaning is itself undesirable in this respect since it releases residual monomer in the reactor to the surrounding atmosphere.

It has been proposed in British Pat. No. 1 444 360 to coat the internal surfaces of a reactor used for vinyl chloride polymerisation with polyethyleneimine in order to prevent or reduce the formation of build-up therein. British Pat. No. 1 439 339 is directed towards the same object but employs, inter alia, polyethyleneimine which has been cross-linked with an aldehyde such as formaldehyde. We have found that these techniques, while effective, are not wholly satisfactory in plant-scale polymer production because there is still some build-up produced, particularly above the liquid level of the polymerisation medium, which necessitates fairly frequent cleaning of the reactor.

We have now discovered an improved technique whereby vinyl halide monomers such as vinyl chloride may be polymerised in aqueous dispersion without any or with a much reduced formation of build-up.

According to the present invention there is provided a process for the polymerisation of vinyl halide monomers in aqueous dispersion wherein polymerisation is carried out in a reactor having adherently deposited on internal surfaces thereof a coating of a product derived from the admixture of at least polyethyleneimine and one or more of hydroquinone, p-benzoquinone, catechol and o-benzoquinone.

There is also provided according to the invention a polymerisation reactor having internal surfaces which have been coated with a coating of a product derived from the admixture of at least polyethyleneimine and one or more of hydroquinone, p-benzoquinone, catechol and o-benzoquinone.

There is further provided according to the invention a product derived from the admixture of at least polyethyleneimine and one or more of hydroquinone, p-benzoquinone, catechol and o-benzoquinone.

The preparation of the coating product may be undertaken under a variety of different conditions.

For example the preparation may be carried out under a wide range of temperature, varying from low temperature preparations with temperatures of the order of 15°–100° C., to preparations at higher temperatures e.g. using temperatures of the order of 100°–150° C. and above. The usual range of preparation temperature is 15°–150° C., typical ranges being 15°–100° C. and 50°–150° C.

The preparation of the coating product is preferably effected in the presence of oxygen. This is conveniently supplied by exposing the constituents from which the product is derived to the surrounding air, such exposure may be during or after admixture. Oxygen may also be supplied by oxygen injection or from an added chemical which is a suitable oxidising agent, p-benzoquinone or o-benzoquinone themselves can sometimes serve as an oxidising agent.

The molar ratio of the polyethyleneimine repeat unit ($-CH_2CH_2NH-$) to the other component(s) (selected from one or more of hydroquinone, p-benzoquinone, catechol and o-benzoquinone) is not critical although the polyethyleneimine (repeat unit) is preferably present in a molar excess. For products derived from polyethyleneimine and hydroquinone the preferred molar ratio of polyethyleneimine (repeat unit)/hydroquinone is 6/0.5 to 1/1, typically 4/1 to 1/1 and particularly 2.5/1 to 1/1.

The preparation of the coating product should preferably be undertaken under alkaline conditions, e.g. the medium in which the admixture takes place having pH >7. Where, as is preferred, a molar excess of polyethyleneimine (an amino compound) is employed for the preparation of the coating product, this criterion is met inherently provided of course that the alkalinity due to the polyethyleneimine is not swamped by the presence of an added acidic substance. Generally speaking, however, it is advantageous to employ an added inorganic alkali such as a metal or ammonium hydroxide (which may be added before, during or after admixture) to ensure an alkaline medium, preferably the inorganic alkali is a caustic alkali such as sodium hydroxide or potassium hydroxide.

In a preferred embodiment of the invention, the coating product is derived from the admixture of hydroquinone and polyethyleneimine under alkaline conditions (pH >7), although p-benzoquinone can be employed in place of or in addition to the hydroquinone in this embodiment.

Other organic oxygen-containing compounds may be incorporated into the mixture from which the coating product is derived, particularly polyhydric phenols having the formula

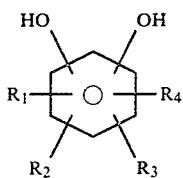

where $R_1$, $R_2$, $R_3$ and $R_4$, which may be the same or different, are selected from H, halogen (fluorine, chlorine, bromine or iodine), hydroxyl, alkoxyl, aryl (including substituted aryl), nitro, alkyl (including substituted alkyl)—preferably lower alkyl, alkenyl (including substituted alkenyl)—preferably lower alkenyl, esterified carboxyl and acyl, provided that the above formula excludes hydroquinone and catechol. The polyhydric phenol preferably contains not more than three nuclear hydroxyl groups and preferably has at least two of $R_1$, $R_2$, $R_3$ and $R_4$ as H. It is to be understood that any substituent should not interfere with the formation of the coating product or with the utility of the resulting coating product to suppress build-up. Examples of such phenols include resorcinol, chlororesorcinol, the isomeric dihydroxy toluenes and xylenes, the isomeric ethyl, propyl, butyl, and pentyl dihydroxy benzenes, pyrogallol, hydroxyquinol, phloroglucinol, the isomeric trihydroxy toluenes and xylenes and the isomeric ethyl, propyl, butyl and pentyl trihydroxy benzenes.

A particularly preferred coating product for use in the invention is one derived by admixing polyethyleneimine, hydroquinone and a small quantity of pyrogallol, the amount of pyrogallol employed typically being <0.3 molar, preferably <0.1 molar, relative to 1 mole of hydroquinone.

The admixture of the constituents for the coating product may be effected on internal surfaces of the reactor, or in a separate operation away from the internal surfaces to form a product which is then applied to the internal surfaces. In both methods the coating product is applied to the surfaces as a dispersion or solution in a liquid carrier medium which must be allowed or caused (e.g. by heating and/or evacuating or blowing through air) to evaporate so as to leave an adherent coating.

Where the admixture is effected on interior surfaces of the reactor, such admixture is preferably carried out at a low temperature, e.g. 15°–100° C., in the presence of oxygen. This method of admixture is particularly applicable to the formation of a coating product derived from polyethyleneimine and hydroquinone and may be conveniently effected by applying separate solutions or dispersions of the polyethyleneimine and hydroquinone sequentially or concurrently to the surface or surfaces to be coated (before adding the ingredients for the vinyl halide polymerisation reaction) whereupon interaction takes place rapidly to form a coating product carried in a liquid medium, particularly when the constituents in the applied solutions or dispersions are exposed to the surrounding oxygen in the air.

Where admixture is effected in a separate operation before application of the coating product to an internal surface, a solution or dispersion of the product in a carrier medium is prepared and this solution or dispersion is applied to the reactor surface e.g. by spraying, painting, dipping or flooding. In this embodiment, the temperature during the admixing operation is not critical, e.g. both the low temperature and high temperature variants mentioned above are effective, the temperature preferably ranging from 15°–150° C. The admixture is sometimes advantageously carried out in the presence of a small amount of an acid catalyst such as hydrochloric acid or aluminium chloride although the use of an acid catalyst is not essential.

In the case of admixing polyethyleneimine and hydroquinone in a separate premixing operation, these constituents are soluble in water so that the mixing may be effected in water as solvent with the water preferably being removed by distillation as part of the admixing operation to form the coating product. In such a case, the reaction temperature is conveniently the boiling point of water at atmospheric pressure (viz about 100° C.); alternatively the admixture may be carried out under subatmospheric pressure so that a lower admixing (and distillation) temperature may be employed, e.g. a temperature of 50°–100° C. may be used, with the reduced pressure greatly facilitating the removal of water.

In another interesting system the coating product is formed by premixing hydroquinone, p-benzoquinone and polyethyleneimine (or correspondingly catechol, o-benzoquinone and polyethyleneimine) under aqueous alkaline conditions, the alkalinity of the medium preferably being ensured by the addition of a metal hydroxide such as sodium hydroxide or potassium hydroxide. The order of mixing of the components of the aqueous alkaline mixture is not critical. For example hydroquinone, p-benzoquinone and polyethyleneimine may first be admixed in water, the hydroquinone and p-benzoquinone for example being added to an agitated aqueous polyethyleneimine solution, and to this mixture may be added a caustic alkali such as sodium or potassium hydroxide (further mixing being optional). Alternatively a mixture of polyethyleneimine and a caustic alkali may be admixed in water and to the agitated mixture added hydroquinone and p-benzoquinone. In a further method a mixture of polyethyleneimine, caustic alkali, hydroquinone and p-benzoquinone may be blended together in water in one step. The relative proportion of the hydroquinone and p-benzoquinone in the mixture is not believed to be very critical; however good results have been achieved when the molar ratio of hydroquinone/p-benzoquinone is substantially unity.

The product obtained from the premixing operation may vary from a very viscous substance to a glass-like substance and normally renders the medium in which the admixture takes place too viscous to be applicable directly to a reactor internal surface, even in cases where the medium has not been removed (e.g. by distillation). Consequently the product resulting from the admixture (whether still in the presence of the admixing medium or not) should normally be diluted with a solvent or dispersant which will then act as a liquid carrier medium for application to reactor internal surfaces. The coating products dissolve in very few liquids; however ethanol (and to a lesser extent methanol) has been found to be an adequate solvent. The coating products will also dissolve in aqueous alkaline solutions (of e.g. NaOH and KOH) which can therefore also be used as solvents. A suitable non-solubilising dispersant is non-alkaline water, although care may sometimes be necessary to ensure that the product is evenly dispersed in the water.

The chemical nature of the coating product is by no means properly understood. However, since the product is invariably deeply coloured (e.g. red, brown or black) it is expected that the product may at least to some extent include aminoquinonoid structures containing groups of the following type

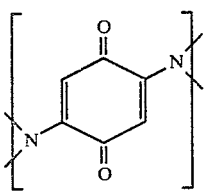

(and/or the corresponding ortho structures) with the nitrogen atoms being derived from the polyethyleneimine chain. It is thought that this type of structure may be rather more significant when admixture takes place at a low temperature, e.g. 15°–100° C.

It is also thought that the coating product consists at least to some extent of a condensation reaction product formed as a result of condensation between the amino groups of the polyethyleneimine and the hydroxy groups of the hydroquinone (and/or catechol).

It is further thought that the coating product consists at least to some extent of a stabilised form of the radical anion structurally derived from p-benzoquinone, i.e. the radical anion of the formula

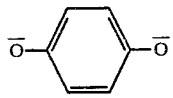

(and/or the corresponding radical structurally derived from o-benzoquinone) the stabilisation being effected by the dispersal of the radical anion in the polyethyleneimine matrix. A strong electron spin resonance (esr) signal characteristic of this radical has in fact been detected from coating products according to the invention which have been tested for this purpose.

The amount of the coating product employed is not critical. Generally speaking, however, an amount of 5 to 200 ppm, preferably 10 to 50 ppm (by weight on the monomer to be charged), coated evenly over internal surfaces of the reactor is sufficient for many sizes and shapes of reactor. Of course, the surface area/volume ratio of reactors will vary considerably according to the sizes of the reactors.

The coating may be formed on any surface inside the reactor which is liable to suffer the formation of build-up thereon. For example, it may be applied to the interior surface of the main body of the reactor, and to the interior surface of the roof of the reactor which is often above the liquid level of the polymerisation medium and usually suffers tenacious build-up thereon. If a condenser is installed in a part of the reactor that is in contact with the gaseous phase during polymerisation or if it is installed outside the reactor and connected thereto by conduit piping, the condenser and conduit piping may be similarly coated. It is to be appreciated that for the best results, a surface to be coated should be as clean and as smooth as possible to begin with. If the surface is of somewhat dubious quality in this respect, it may be advisable to coat it with two or more successively applied layers of the coating.

The coating may be formed on a surface in combination with one or more other materials, e.g. materials which also have a suppressing effect on polymerisation build-up.

A reactor having coated internal surfaces according to the invention may be used for the polymerisation of vinyl halide monomers particularly vinyl chloride, wherein the formation of build-up is eliminated or very much suppressed. The polymerisation reaction is preferably carried out in the presence of a basic substance such as $NaHCO_3$ or a suitable buffering system to ensure an adequately high pH for the reaction medium (e.g. pH $>4$) as such an expedient can further enhance the build-up suppressant effect of the coating product.

By "vinyl halide monomers" is meant those monomers polymerisable by free-radical polymerisation which are olefinically unsaturated in the $\alpha$-position and substituted by at least one halogen atom. These monomers are preferably selected from substituted derivatives of ethylene and contain only two carbon atoms. Examples of such monomers include vinyl chloride, vinyl bromide, vinyl fluoride, vinylidene chloride, vinylidene fluoride, chlorotrifluoroethylene and tetrafluoroethylene. The invention is preferably applied to the polymerisation of fluorine- or chlorine-containing vinyl monomers, especially vinyl chloride.

By "polymerisation" is meant both the homopolymerisation of the vinyl halide monomers and the copolymerisation with each other or with other comonomers copolymerisable therewith. Examples of the latter include vinyl esters such as vinyl acetate, acrylic esters such as methyl acrylate and butyl methacrylate, acrylic nitriles such as acrylonitrile and methacrylonitrile, unsaturated diesters such as diethyl maleate, allyl esters such as allyl acetate, $\alpha$-olefines such as ethylene and propylene, vinyl ethers and styrene compounds.

We prefer to apply the invention to the production of polymers containing at least 50% molar and more particularly at least 80% molar, of units derived from vinyl halide monomers, particularly vinyl chloride.

The present invention may be particularly employed in any polymerisation technique where a monomer(s) is dispersed in the form of droplets in a liquid aqueous phase. For example it may be used for polymerisation in aqueous emulsion in which case any suitable emulsifying agent can be used, and in particular an ionic emulsifying agent such as sodium lauryl sulphonate or sodium dodecyl benzene sulphonate, and non-ionic emulsifying agents. It is also possible to use any water-soluble free-radical polymerisation initiator and particularly a persulphate.

The invention is also very applicable to polymerisation in aqueous suspension and microsuspension.

Any suitable dispersing agent may be used for polymerisation in aqueous suspension, and particularly finely dispersed solids, gelatin, polyvinyl acetates of various degrees of hydrolysis, water-soluble cellulosic esters and polyvinyl pyrrolidones. These dispersing agents can be used together with other surface-active agents if desired. The amount employed may vary widely and is generally between 0.05 and 1.5% by weight calculated on the water used.

Any suitable free-radical polymerisation initiator that is monomer-soluble may be used for polymerisation in aqueous suspension. Examples of these include peroxy compounds such as di-tertiarybutyl peroxide, lauroyl peroxide and acetyl cyclohexyl sulphonyl peroxide, azo compounds such as azo-bis-isobutyronitrile and 2,2'-azo-bis-2,4-dimethylvaleronitrile and boron alkyls. Monomer-soluble free-radical polymerisation initiators that are particularly suitable for use in a polymerisation process according to the invention are the dialkyl peroxydicarbonates whose alkyl radicals contain up to 20 carbon atoms, such as diethyl peroxydicarbonate, diisopropyl peroxydicarbonate and dicetyl peroxydicarbonate, dicycloalkyl peroxydicarbonates such as bis(4-tertiarybutylcyclohexyl)peroxydicarbonate, and azo compounds such as 2,2'-azo-bis-2,4-dimethylvaleronitrile and azo-bis-isobutyronitrile. These initiators may be used in conventional quantities—generally speaking from 0.01 to 1% by weight calculated on monomer.

Polymerisation in homogenised aqueous dispersion, sometimes known as polymerisation in microsuspension, comprises mechanically homogenising an aqueous dispersion of the monomer or monomers in the presence of a surface-active agent (for example by subjecting it to a violent shearing action in a colloid mill), and polymerising the homogenised dispersion in the presence of an initiator that is monomer-soluble.

Conventional emulsifying agents and monomer-soluble initiators can be used for polymerisation in microsuspension such as for example a cationic emulsifying agent like sodium dodecylbenzene sulphonate, and peroxide initiators of the dialkanoyl peroxide type, e.g. lauroyl peroxide.

In addition to the emulsifying or dispersing agents and initiators, the aqueous dispersions (i.e. suspensions, microsuspensions and emulsions) may contain one or more additives that are sometimes employed in conventional processes for polymerisation in aqueous dispersion. Examples of such additives include particle size regulators, molecular weight regulators, stabilisers, plasticisers, colouring agents, reinforcing agents, and processing aids.

The operating conditions for polymerisation according to the present invention may be those customarily used. For example, in the case of vinyl chloride polymerisation, the polymerisation temperature is generally between 40° and 75° C. and the pressure generally below 15 kg/cm$^2$.

The present invention is now illustrated by the following Examples. Unless otherwise specified all parts and percentages are by weight. Where it was necessary to remove the dark stain of coating compound on a surface, this was done by scouring with a wetted non-abrasive mesh of soft copper wool.

EXAMPLE 1

A reactor made of stainless steel (capacity 160 liters) and provided with a paddle stirrer was used. The reactor interior was thoroughly cleaned by hydrodynamic pressure washing.

A conventional vinyl chloride suspension homopolymerisation was carried out at 57° C. in the reactor using 100 parts of vinyl chloride, 160 parts of water, 0.13% of partially hydrolysed polyvinyl acetate (based on vinyl chloride) as suspension agent and 0.038% of diethylperoxydicarbonate (based on vinyl chloride) as initiator. Polymerisation was continued until well into the pressure-drop region when the polymerisation was terminated by venting off the monomer.

Inspection of the reactor interior, after removing the polymer slurry, revealed that severe build-up had formed on the roof of the autoclave, there was also a chalky film on the side wall of the reactor.

EXAMPLE 2

The reactor was thoroughly hydrodynamically cleaned and the interior surfaces sprayed first with 10 ppm (based on vinyl chloride) of polyethyleneimine (as a 1% aqueous solution) and then with 10 ppm (based on vinyl chloride) of hydroquinone (as a 1% aqueous solution). The coating rapidly dried at ambient temperature (about 20° C.), no heat being applied, and imparted a reddish tinge to the reactor surface.

Polymerisation was then carried out using the procedure of Example 1. Inspection of the reactor interior after removing the polymer slurry revealed that the reactor interior surfaces (walls and roof) were perfectly clean and shiny.

EXAMPLE 3

The reactor, after carrying out Example 2, was not cleaned but was again coated using the procedure of Example 2. Polymerisation was carried out in the reactor using the procedure of Example 1.

The roof of the reactor was perfectly clean and shiny although a chalky film had formed over a small area of the wall.

EXAMPLE 4

The reactor, after carrying out Example 3, was not cleaned but was again coated using the procedure of Example 2. Polymerisation was carried out in the reactor using the procedure of Example 1.

The roof of the reactor was perfectly clean and shiny although a thin white skin had formed over a small area of the wall.

EXAMPLE 5

The reactor, containing no trace of coating product according to the invention and having also been hydrodynamically cleaned, was sprayed internally first with 10 ppm (based on vinyl chloride) of polyethyleneimine (as a 1% aqueous solution) and then with 10 ppm (based on vinyl chloride) of p-benzoquinone (as a 1% ethanolic solution). The coating rapidly dried at ambient temperature (about 20° C.), no heat being applied, and imparted a reddish tinge to the reactor surface.

Polymerisation was then carried out using the procedure of Example 1. Inspection of the reactor interior, after removing the polymer slurry, showed that the wall and roof were perfectly clean and shiny.

EXAMPLE 6

The internal surfaces of the reactor used for Example 1, containing no trace of coating product according to the invention and having been hydrodynamically cleaned, were coated using the procedure of Example 2.

Polymerisation was carried out in the reactor using the procedure of Example 1 except that 100 ppm of NaHCO$_3$ were added to the aqueous medium before the start of polymerisation.

The interior surfaces of the reactor (roof and wall) were found to be perfectly clean and shiny after the polymer slurry had been removed.

EXAMPLE 7

The internal surfaces of the reactor, containing no trace of coating product according to the invention and having been hydrodynamically cleaned, were coated using the procedure of Example 2, except that the amount of polyethyleneimine used was 20 ppm and the amount of hydroquinone used was 20 ppm.

Polymerisation was then carried out using the procedure of Example 6. After removing the polymer slurry it was observed that the interior of the reactor (roof and walls) was perfectly clean and shiny.

EXAMPLE 8

The reactor, after removing the polymer slurry from Example 7, was not hydrodynamically cleaned but was coated using the procedure of Example 2 except that 50 ppm of polyethyleneimine and 50 ppm of hydroquinone were used.

Polymerisation was carried out using the procedure of Example 6. After removing the polymer slurry it was observed that the interior of the reactor (roof and walls) was perfectly clean and shiny. However it was noticed that parts of the roof had brown stains thereon, presumably due to excess of the coating product.

EXAMPLE 9

The roof of the reactor after removing the polymer slurry of Example 8 was scoured as appropriate to remove the brown stains, but was not hydrodynamically cleaned. The reactor was then coated using the procedure of Example 2 except that 25 ppm of polyethyleneimine and 15 ppm of hydroquinone were used.

Polymerisation was then carried out using the procedure of Example 6. After removing the polymer slurry it was observed that the interior of the reactor (roof and walls) was perfectly clean and shiny.

EXAMPLE 10

The reactor, containing no trace of coating product according to the invention and having been hydrodynamically cleaned, was employed for a vinyl chloride polymerisation using the procedure of Example 1 except that the initiator used was 0.061% (based on vinyl chloride) of bis(4-tertiarybutylcyclohexyl)peroxydicarbonate.

Build-up was formed on the roof and a chalky film was formed on part of the walls of the autoclave.

EXAMPLE 11

The hydrodynamically cleaned reactor, containing no trace of coating product, was coated using the procedure of Example 2. Polymerisation was then carried out in the reactor using the procedure of Example 10.

The roof and walls of the reactor after the polymerisation were perfectly clean and shiny.

EXAMPLE 12

The hydrodynamically cleaned reactor, containing no trace of coating product, was coated using the procedure of Example 2 except that 20 ppm of polyethyleneimine and 10 ppm of hydroquinone were used.

Polymerisation was then carried out in the reactor using the procedure of Example 6. The roof and walls of the reactor were found to be perfectly clean and shiny.

EXAMPLE 13

After removing the slurry of Example 12, and without cleaning the reactor, the polymerisation of Example 6 was again carried out in the reactor, After polymerisation the walls and roof of the reactor were still perfectly clean and shiny.

EXAMPLE 14

The hydrodynamically cleaned reactor, containing no trace of coating product, was coated using the procedure of Example 2 except that 15 ppm of polyethyleneimine and 7.5 ppm of hydroquinone were used.

Polymerisation was then carried out using the procedure of Example 6. The roof and walls of the reactor were found to be perfectly clean and shiny

EXAMPLE 15

The reactor, containing no trace of coating product according to the invention and having also been hydrodynamically cleaned, was not coated according to the invention but used straight away for a vinyl chloride polymerisation. The polymerisation procedure was that of Example 6 (i.e. 100 ppm of $NaHCO_3$ were added to the aqueous medium before the start of polymerisation).

Significant build-up was observed on the roof of the reactor showing that the effect of build-up prevention is not merely due to the action of $NaHCO_3$.

EXAMPLE 16

A mixture of polyethyleneimine (129 ml of a 20% aqueous solution), hydroquinone (16.5 g) and conc. HCl (3.75 ml) was prepared, the mixture corresponding to a molar ratio of 4(polyethyleneimine repeat unit)/1(hydroquinone). The mixture was heated to reflux temperature (100° C.), the hydroquinone dissolving at 60°-70° C. so that a clear solution resulted. Water was distilled from the mixture until most of it had been removed (ca 1 hour). Small quantities of the starting materials were removed in the distillate. The residual water was removed with nitrogen.

The product obtained was a rubbery, dark reddish-brown material which dissolved in ethanol but not in dimethyl formamide, acetone, methylene chloride, chloroform, and various other common organic solvents.

EXAMPLE 17

The procedure of Example 16 was repeated except that the initial reaction mixture also contained pyrogallol (1.65 g)—the mixture corresponding to a molar ratio of 4(polyethyleneimine repeat unit)/1(hydroquinone)/0.1(pyrogallol). The distillation took ca 1 hour.

The product was a brown-black material which was extremely viscous (almost a solid), suggesting that it possessed a high degree of cross-linking. Like the product of Example 16 it was insoluble in various common organic solvents, but was soluble in ethanol.

EXAMPLES 18–24

In these Examples, conventional vinyl chloride suspension homopolymerisations were carried out in a stainless steel reactor (capacity 5 liters) provided with a paddle stirrer. Unless otherwise indicated the interior surfaces of the reactor were thoroughly cleaned before each polymerisation. The polymerisations were carried out at 57° C. using 100 parts vinyl chloride, 222 parts water, 0.22% of partially hydrolysed polyvinyl acetate (based on vinyl chloride charged) as suspending agent, and bis(4-tertiarybutylcyclohexyl) peroxydicarbonate as initiator (amounts as shown in Table 1). Polymerisation was continued until well into the pressure-drop region when the polymerisation was terminated by venting off the monomer. In Examples 19–24 the interior surfaces of the reactor were painted with 10 ml of ethanol having dissolved therein a certain amount of the product of either Example 16 or Example 17 (ppm based on vinyl chloride charged as indicated in Table 1), the coatings being allowed to dry before charging the polymerisation ingredients.

The polymerisations of Examples 20, 21 and 22 were carried out successively in the reactor, and before the polymerisations of Examples 21 and 22, the pre-cleaning of the reactor body and roof was omitted. The polymerisations of Examnples 23 and 24 were carried out successively in the reactor and pre-cleaning of the reactor body and roof was omitted before the polymerisation of Example 24.

The observations of build-up formation in each case (after removing the polymer slurry and washing off any loosely adhering sofe wet-cake) are shown in Table 1. It can be seen that the application of a coating product according to the invention had a pronounced suppressing effect on build-up.

clohexyl)peroxydicarbonate as initiator (amounts as shown in Table 2). The polymerisations were continued until well into the pressure-drop region when they were terminated by venting off the monomer. In Examples 26–30, the interior surfaces of the reactor were sprayed with 50 ml of ethanol having dissolved therein a certain amount of the product of either Example 16 or Example 17 (ppm based on vinyl chloride charged as indicated in Table 2), the coatings being allowed to dry before charging the polymerisation ingredients.

The polymerisations of Examples 26, 27 and 28 were carried out successively in the reactor, and before the polymerisations of Examples 27 and 28, the pre-cleaning of the reactor body and roof was omitted.

The observations of build-up formation in each case (after removing the polymer slurry and washing off any loosely adhering soft wet-cake) are given in Table 2. It can be seen that the application of a coating product according to the invention had a pronounced suppressing effect on build-up formation.

TABLE 1

| Ex. No. | Amount Initiator used (on vinyl chloride charged) | Coating Product Applied Source | Coating Product Applied Amount | Build-up Observations Main body of reactor | Build-up Observations Roof of reactor |
|---|---|---|---|---|---|
| 18 | 0.08% | | None applied | Chalky build-up on upper area | Hard cake plus skin |
| 19 | 0.08% | Ex. 16 | 20 ppm (painted) | Clean | Some flaky cake - easily removed by washing |
| 20 | 0.08% | Ex. 17 | 50 ppm (painted) | Clean | Clean |
| 21 | 0.08% | Ex. 17 | 50 ppm (painted) | Clean | Clean |
| 22 | 0.08% | Ex. 17 | 50 ppm (painted) | Some patches of light skin | Some flaky cake - easily removed by washing |
| 23 | 0.08% | Ex. 16 | 100 ppm (painted) | Clean | Clean |
| 24 | 0.08% | Ex. 16 | 100 ppm (painted) | Clean | Clean |

TABLE 2

| Ex. No. | Amount Initiator used (on vinyl chloride charged) | Coating Product Applied Source | Coating Product Applied Amount | Build-up Observations Main Body of reactor | Build-up Observations Roof of reactor |
|---|---|---|---|---|---|
| 25 | 0.06% | | None applied | Chalky build-up on upper area | Patches of cake and skin |
| 26 | 0.078% | Ex. 16 | 20 ppm (sprayed) | Clean | Clean |
| 27 | 0.078% | Ex. 16 | 30 ppm (sprayed) | Clean | Clean |
| 28 | 0.078% | Ex. 16 | 50 ppm (sprayed) | Clean | Clean |
| 29 | 0.078% | Ex. 17 | 120 ppm (sprayed) | Clean | Clean |
| 30 | 0.078% | Ex. 17 | 30 ppm (sprayed) | Clean | Clean |

EXAMPLES 25–30

In these Examples, conventional vinyl chloride suspension homopolymerisations in aqueous suspension were carried out in a stainless steel reactor (capacity 160 liters) provided with a paddle stirrer. Unless otherwise indicated the interior surfaces of the reactor were thoroughly cleaned before each polymerisation. The polymerisations were carried out at 57° C. using 100 parts vinyl chloride, 156 parts water, 0.13% partially hydrolysed polyvinyl acetate (based on vinyl chloride charged) as suspending agent and bis(4-tertiarybutylcy-

EXAMPLES 31–33

The polymerisation procedure of Examples 25–30 was employed except that the initiator used was diethyl peroxydicarbonate (amounts as indicated in Table 3). In Examples 32 and 33 the interior surfaces of the reactor were sprayed with 50 ml of ethanol having dissolved therein a certain amount of the product of either Example 16 or 17 (ppm based on vinyl chloride charged as indicated in Table 3), the coatings being allowed to dry.

The polymerisations of Examples 32 and 33 were carried out successively in the reactor and pre-cleaning of the reactor body and roof was omitted before the polymerisation of Example 33.

The observations of build-up formation in each case (after removing the polymer slurry and washing off any loosely adhering soft wet-cake) are given in Table 3. It can be seen that the application of a coating product according to the invention had a pronounced suppressing effect on build-up formation.

TABLE 3

| Ex. No. | Amount Initiator used (on vinyl chloride charged) | Coating Product Applied Source | Coating Product Applied Amount | Build-up Observations Main body of reactor | Build-up Observations Roof of reactor |
|---|---|---|---|---|---|
| 31 | 0.038% | | None applied | Chalky build-up on upper area | Skin plus hard build-up |
| 32 | 0.038% | Ex. 16 | 30 ppm (sprayed) | Clean | Clean except for a few trace spots of build-up |
| 33 | 0.038% | Ex. 17 | 30 ppm (sprayed) | Clean | A few trace patches of hard cake |

EXAMPLE 34

A mixture of polyethyleneimine solution (145 ml of a 20% aqueous solution), potassium hydroxide solution (57 g of a 50% w/v aqueous solution), hydroquinone (12 g) and p-benzoquinone (12 g) were blended in a commercially available mixing machine at ambient temperature (about 20° C.), the hydroquinone and p-benzoquinone being added to the polyethyleneimine solution and potassium hydroxide solution with the machine operating. The resulting product was a viscous, dark-red gel. The gel was diluted with 450 ml of water.

EXAMPLE 35

A mixture of polyethyleneimine solution (145 ml of a 20% aqueous solution), water (100 ml), hydroquinone (12 g) and p-benzoquinone (12 g) were blended in a commercially available mixing machine at ambient temperature (about 20° C.), the hydroquinone and p-benzoquinone being added to the polyethyleneimine solution and water with the mixing machine operating. It was necessary to add a further 100 ml water during the mixing since the mixture became very viscous. Sodium hydroxide solution (8.72 g dissolved in 100 ml water) was added, the resulting product being a black-red gel containing some precipitated material. This gel was diluted with 350 ml water, the precipitate being separated by decantation as completely as possible.

EXAMPLES 36–39

In these Examples, conventional vinyl chloride suspension homopolymerisations were carried out in a stainless steel reactor (capacity 160 liters) provided with a paddle stirrer. Unless otherwise indicated the interior surfaces of the reactor were thoroughly cleaned before each polymerisation. The polymerisations were carried out at 57° C. using 100 parts vinyl chloride, 154 parts water, partially hydrolysed polyvinyl acetate (0.13% based on vinyl chloride charged) as suspending agent, and bis(4-tertiarybutylcyclohexyl)peroxydicarbonate as initiator (0.065% based on vinyl chloride charged). Polymerisation was continued until well into the pressure-drop region when the polymerisation was terminated by venting off the monomer. In Examples 37 and 38 the interior surfaces of the reactor were painted with aqueous alkaline mixture of Example 34, while in Example 39, the interior surfaces were painted with the aqueous alkaline mixture of Example 35, in each case the amount applied was such that the estimated solids content was 30 ppm based on the vinyl chloride charged. The coatings were allowed to dry before charging the polymerisation ingredients.

The polymerisations of Examples 37 and 38 were carried out successively in the reactor without inter-batch cleaning.

The observations of build-up formation in each case (after removing the polymer slurry and washing off any lossely adhering soft wet-cake) are shown in Table 4. It can be seen that the application of a coating product according to the invention had a pronounced suppressing effect on build-up formation.

TABLE 4

| Example No. | Coating Product Applied Source | Coating Product Applied Amount (solids) | Build-up Observations Main Body of reactor | Build-up Observations Roof of reactor |
|---|---|---|---|---|
| 36 | | None applied | Chalky build-up | Hard cake plus skin |
| 37 | Example 34 | 30 ppm (painted) | Clean | Clean |
| 38 | Example 34 | 30 ppm (painted) | Clean | Clean |
| 39 | Example 35 | 30 ppm (painted) | Clean | Clean |

EXAMPLE 40

The procedure of Example 16 was repeated except that the initial reaction mixture was polyethyleneimine (21.5 ml of a 20% aqueous solution), catechol (2.75 g) and conc. HCl (0.5 ml). The distillation took ca 1 hour.

The product was a rubbery, dark reddish-brown material which, like the products of Examples 16 and 17, dissolved in ethanol.

EXAMPLES 41 and 42

In these Examples the procedure of Examples 18–24 was repeated except that the interior surfaces of the reactor were coated with the product of Example 40, as indicated in Table 5.

The polymerisations of Examples 41 and 42 were carried out successively in the reactor, and before the polymerisation of Example 42, the pre-cleaning of the reactor body and roof was omitted.

The observations of build-up formation in each case (after removing the polymer slurry and washing off any loosely adhering soft wet-cake) are given in Table 5. It can be seen that the application of a coating material according to the invention had a pronounced suppressing effect on build-up formation.

TABLE 5

| Ex. No. | Amount Initiator used (on vinyl chloride charged) | Coating Product Applied | | Build-up Observations | |
|---|---|---|---|---|---|
| | | Source | Amount | Main body of reactor | Roof of reactor |
| 41 | 0.08% | Ex. 40 | 50 ppm (painted) | Clean | Clean except for a little flaky cake - easily washed off |
| 42 | 0.08% | Ex. 40 | 50 ppm (painted) | Clean | Clean |

EXAMPLE 43

A reactor made of stainless steel (capacity 160 liters) and having thoroughly cleaned interior surfaces, was sprayed internally first with 32 ppm (based on the subsequently charged vinyl chloride) of 4,7-diazadecane-1,10-diamine (formula $NH_2(CH_2)_3NH(CH_2)_2NH(CH_2)_3NH_2$) as a 1% aqueous solution and then with 10 ppm (based on the subsequently charged vinyl chloride) of hydroquinone as a 20% aqueous solution, the approximate molar ratio of the diamine to the hydroquinone being 2/1. The coating rapidly turned to an almost black colour at ambient temperature (about 20° C.) and was allowed to dry without heat being applied.

A conventional vinyl chloride polymerisation was carried out at 57° C. in the reactor using 100 parts of vinyl chloride, 154 parts of water, 0.13% of partially hydrolysed polyvinyl vinyl acetate (based on vinyl chloride) as suspension agent and 0.038% (based on vinyl chloride) of diethyl peroxydicarbonate as initiator. Polymerisation was continued until well into the pressure-drop region when the polymerisation was terminated by venting off the monomer.

Inspection of the reactor interior, after removing the polymer slurry, revealed that chalky build-up had formed on the side wall of the reactor, chalky build-up plus a thin skin of build-up and a few hard lumps had also formed on the roof of the reactor.

EXAMPLE 44

A mixture of neat ethylene diamine (6 g), solid hydroquinone (11 g) and conc. HCl (0.5 ml) was prepared at ambient temperature (about 20° C.), the mixture corresponding to a molar ratio of ethylene diamine to hydroquinone of about 1/1. An exothermic reaction rapidly took place and 10 ml of water were added to improve the dispersion of the product. The mixture was then heated to 100° C. whereupon the product became viscous and deep red in colour. The heating was removed and the product solidified on cooling. The product was found to be soluble in ethanol.

The product (30 ppm based on the vinyl chloride subsequently charged) as an approximately 10% ethanolic solution was sprayed onto the internal surfaces of a clean stainless steel reactor (capacity 160 liters) and the ethanol allowed to evaporate without heat being applied. A conventional vinyl chloride polymerisation was then carried out in the reactor at 57° C. using 100 parts of vinyl chloride, 154 parts of water, 0.13% of partially hydrolysed polyvinyl acetate (based on vinyl chloride) as suspension agent and 0.078% (based on vinyl chloride) of bis(4-tertiarybutylcyclohexyl) peroxydicarbonate as initiator. Polymerisation was carried out until well into the pressure drop region when the polymerisation was terminated by venting off the monomer.

Inspection of the reactor interior, after removing the polymer slurry, revealed that the roof of the reactor had significant deposits of build-up thereon, although the side wall of the reactor was clean.

We claim:

1. A process for the polymerisation of vinyl halide monomers in aqueous dispersion wherein polymerisation is carried out in a reactor having adherently deposited on internal surfaces thereof a coating of a coating product comprising the reaction admixture of at least polyethyleneimine and one or more of hydroquinone, p-benzoquinone, catechol and o-benzoquinone.

2. A process according to claim 1 wherein the admixture is effected at a temperature of 15°–150° C.

3. A process according to claim 1 wherein the coating product is prepared in the presence of oxygen or an oxidising agent.

4. A process according to claim 1 wherein the coating product comprises the reactive admixture of polyethyleneimine and hydroquinone.

5. A process according to claim 4 wherein the molar ratio of the polyethyleneimine repeat unit ($-CH_2CH_2NH-$) to hydroquinone is within the range 6/0.5 to 1/1.

6. A process according to claim 1 wherein the coating product comprises the reactive admixture of polyethyleneimine, one or more of hydroquinone, p-benzoquinone, catechol and o-benzoquinone, and at least one polyhydric phenol having the formula

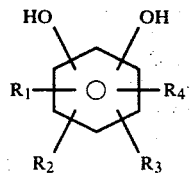

wherein $R_1$, $R_2$, $R_3$ and $R_4$, which may be the same or different, are selected from the group consisting essentially of H, halogen, hydroxyl, alkoxyl, aryl, substituted aryl, nitro, alkyl, substituted alkyl, alkenyl, substituted alkenyl, esterified carboxyl or acyl, provided that said formula excludes hydroquinone and catechol.

7. A process according to claim 6 wherein the coating product comprises the reactive admixture of hydroquinone, polyethyleneimine, and pyrogallol.

8. A process according to claim 1 wherein the admixture of the constituents for the coating product is effected in the presence of oxygen or an oxidising agent on internal surfaces of the reactor, the coating product being formed as a dispersion or solution in a liquid carrier medium which is allowed or caused to evaporate so as to leave an adherent coating.

9. A process according to claim 1 wherein the admixture of the constituents of the coating product is effected before application of the coating product to reactor internal surfaces, the coating product formed after said admixture then being applied to reactor surfaces as a solution or dispersion in a liquid carrier medium which is allowed or caused to evaporate so as to leave an adherent coating.

10. A process according to claim 9 wherein at least hydroquinone and polyethyleneimine are admixed in water acting as a common solvent, water is removed by distillation, and the resulting coating product is applied to internal surfaces of the reactor dissolved in a liquid carrier medium.

11. A process according to claim 9 wherein hydroquinone, p-benzoquinone and polyethyleneimine are admixed in an aqueous alkaline medium to form the coating product.

12. A polymerisation reactor having adherently deposited on internal surfaces thereof a coating of a coating product comprising the reactive admixture of at least polyethyleneimine and one or more of hydroquinone, p-benzoquinone, catechol and o-benzoquinone.

13. A reactor according to claim 12 wherein the admixture is effected at a temperature of 15°–150° C.

14. A reactor according to claim 12 wherein the coating product is prepared in the presence of oxygen or an oxidising agent.

15. A reactor according to claim 12 wherein the coating product comprises the reactive admixture of polyethyleneimine and hydroquinone.

16. A reactor according to claim 15 wherein the molar ratio of the polyethyleneimine repeat unit (—CH$_2$CH$_2$NH—) to hydroquinone is within the range 6/0.5 to 1/1.

17. A reactor according to claim 12 wherein the coating product comprises the reactive admixture of polyethyleneimine, one or more of hydroquinone, p-benzoquinone, catechol and o-benzoquinone, and at least one polyhydric phenol having the formula

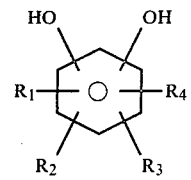

wherein $R_1$, $R_2$, $R_3$ and $R_4$, which may be the same or different, are selected from the group consisting essentially of H, halogen, hydroxyl, alkoxyl, aryl, substituted aryl, nitro, alkyl substituted alkyl, alkenyl, substituted alkenyl, esterified carboxyl and acyl, provided that said formula excludes hydroquinone and catechol.

18. A reactor according to claim 17 wherein the coating product comprises the reactive admixture of hydroquinone, polyethyleneimine, and pyrogallol.

19. A reactor according to claim 12 wherein the admixture of the constituents for the coating product is effected in the presence of oxygen or an oxidising agent on internal surfaces of the reactor, the coating product being formed as a dispersion or solution in a liquid carrier medium which is allowed or caused to evaporate so as to leave an adherent coating.

20. A reactor according to claim 12 wherein the admixture of the constituents of the coating product is effected before application of the coating product to reactor internal surfaces, the coating product formed by such admixture then being applied to reactor surfaces as a solution or dispersion in a liquid carrier medium which is allowed or caused to evaporate so as to leave an adherent coating.

21. A reactor according to claim 20 wherein at least hydroquinone and polyethyleneimine are admixed in water acting as a common solvent, water is removed by distillation, and the resulting coating product is applied to internal surfaces of the reactor dissolved in a liquid carrier medium.

22. A reactor according to claim 20 wherein hydroquinone, p-benzoquinone and polyethyleneimine are admixed in an aqueous alkaline medium to form the coating product.

* * * * *

UNITED STATES PATENT AND TRADEMARK OFFICE
CERTIFICATE OF CORRECTION

PATENT NO. : 4,181,787
DATED : January 1, 1980
INVENTOR(S) : Malcolm Peter McOnie, et al It is certified that error appears in the above—identified patent and that said Letters Patent is hereby corrected as shown below:

Column 5, line 30, please correct the formula to read:

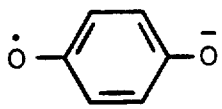

Claim 1, line 5, change "reaction" to read --reactive--.

Signed and Sealed this

Twenty-fourth Day of June 1980

[SEAL]

Attest:

SIDNEY A. DIAMOND

Attesting Officer  Commissioner of Patents and Trademarks